Oct. 26, 1926.
B. P. HANSON
BUMPER
Filed June 1, 1926    2 Sheets-Sheet 1
1,604,691
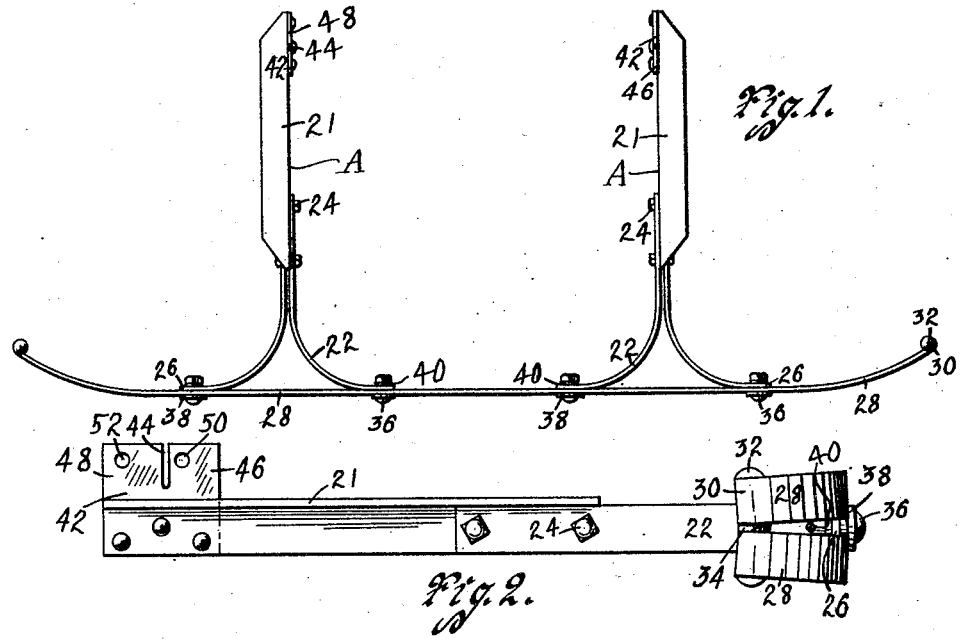
Fig. 1.
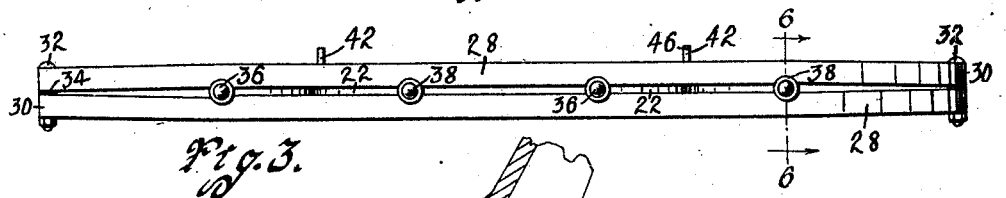
Fig. 2.
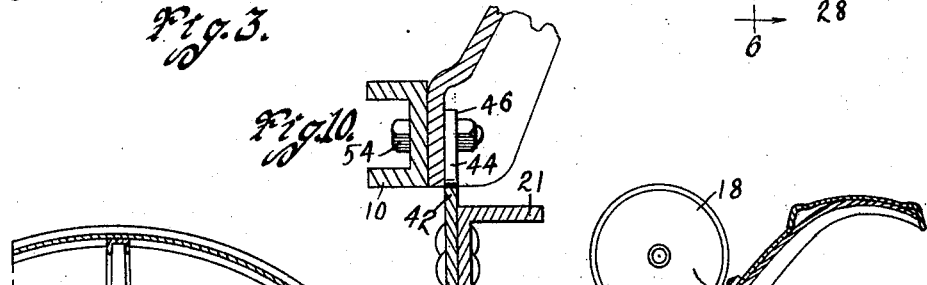
Fig. 3.
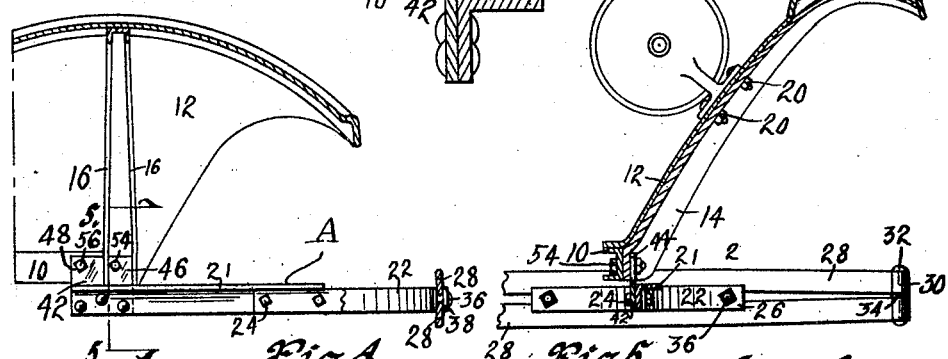
Fig. 10.
Fig. 4.
Fig. 5.
Witness
L. F. Sandberg
Inventor
Bennie P. Hanson
by Bair & Freeman Attorneys

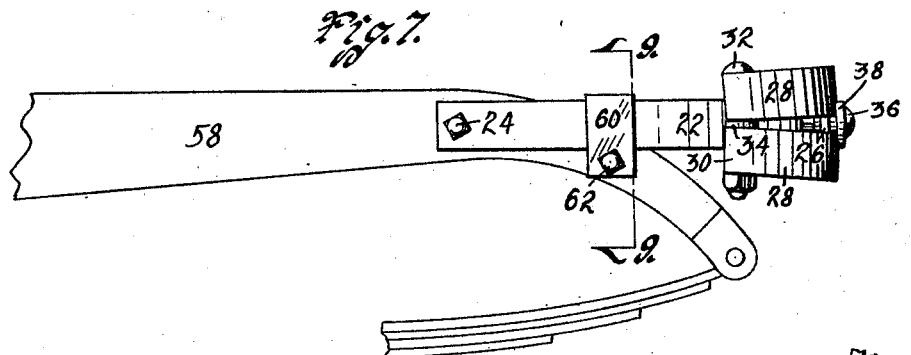
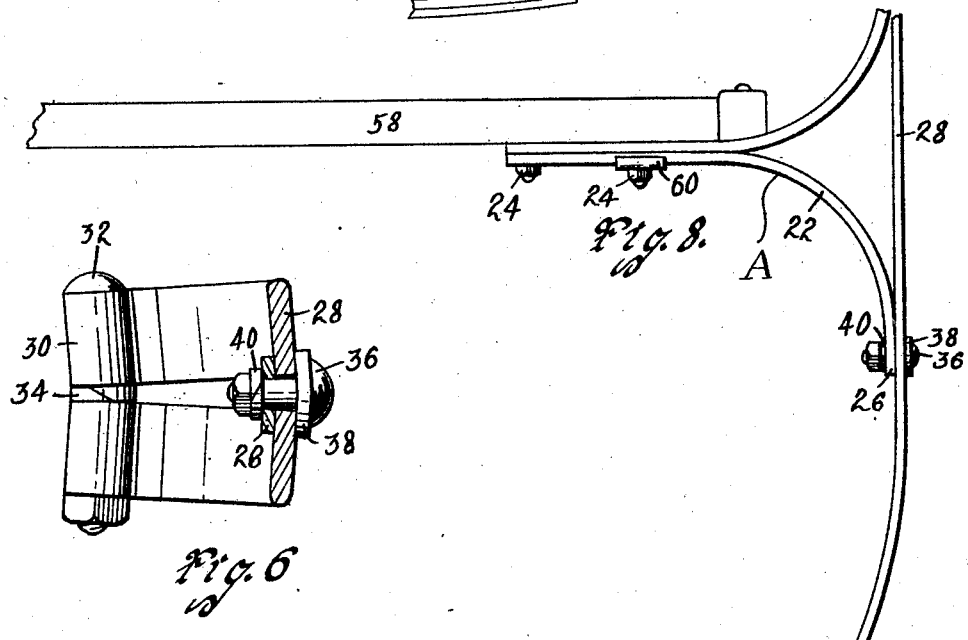
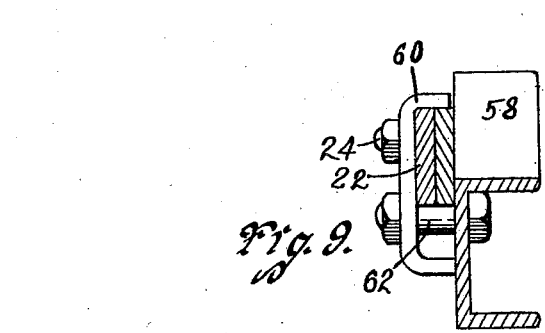
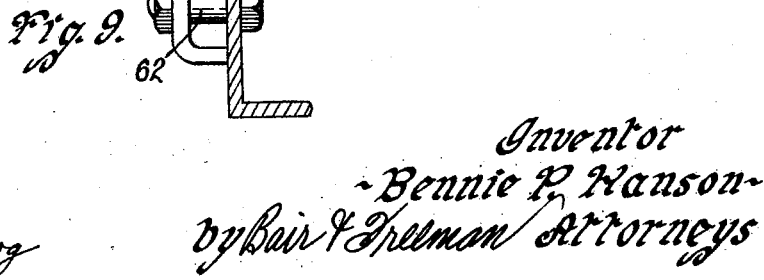

Patented Oct. 26, 1926.

1,604,691

UNITED STATES PATENT OFFICE.

BENNIE P. HANSON, OF CEDAR FALLS, IOWA, ASSIGNOR TO EDWARD L. MOORE, OF WATERLOO, IOWA.

BUMPER.

Application filed June 1, 1926. Serial No. 112,908.

The object of my invention is to provide a bumper for automobiles of simple, durable and comparatively inexpensive construction.

More particularly it is my object to provide a bumper having a pair of bumper elements connected to the automobile frame or chassis by a pair of spaced supporting members, employing the standard parts of the automobile chassis itself to fasten the supporting members thereto.

Still a further object is to provide a bumper support fastening adapted to coact with a channel shaped fender brace on the automobile whereby the bumper support is partially received between the two legs of the brace giving rigidity to the bumper support when it is secured to the chassis.

Still a further object is to provide a pair of bumper elements spaced apart between their ends and adapted to have their ends brought together, placing the remainder of the bumper elements under tension so that when fastening devices are connected to the bumper elements in the space therebetween such fastening devices will be under tension preventing any slipping of the fastenings relative to the bumper elements when the parts have been installed.

Still a further object is to provide fastening bolts between the bumper elements and the bumper supports which serve to space the bumper elements one above another in spaced relation and at the same time connect the bumper support to the bumper elements.

Still a further object is to provide a pair of diverging arms upon each bumper support which are fastened to the bumper elements at spaced points for preventing any sideward swaying movement of the bumper elements relative to the support and at the same time providing spaced connections between each support and the bumper elements for giving greater strength to the bumper structure.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1, is a top plain view of my bumper.

Figure 2, is a side view of the same showing the fastening for the supporting member and the ends of the two bumper elements brought together.

Figure 3, is a front view showing the bumper elements spaced apart between their ends and brought together at their ends.

Figure 4, is an enlarged detail view showing the connection between the inner ends of the bumper supports and the automobile chassis.

Figure 5, is a detail sectional view taken on line 5—5 of Figure 4.

Figure 6, is a detail sectional view through the bumper elements and support taken on line 6—6 of Figure 3.

Figure 7, is a side view of a portion of an automobile chassis with my bumper installed thereon.

Figure 8, is a top plan view of the same.

Figure 9, is a sectional view taken on line 9—9 of Figure 7 illustrating the clip for fastening the bumper support to the automobile, and Figure 10, is an enlarged detail sectional view similar to Figure 5.

In the accompanying drawings I have used the reference numeral 10 to indicate generally the chassis of an automobile to which are connected fenders 12 by fender braces 14.

The fender braces 14 are channel shaped in cross section and include the spaced legs or flanges 16. Each fender 12 is connected to the brace 14 by any suitable means.

A lamp bracket 18 is connected to each apron of the fenders 12 and the braces 14 by bolts or the like 20. The parts just described are of the ordinary construction found upon Ford automobiles.

My bumper as illustrated in the accompanying drawings is especially adapted for use as a front bumper, although, it may equally as well be used for a rear or back bumper. My bumper includes a pair of spaced bumper supports A. Each bumper support A comprises a main support 21 which I have shown as formed of angle material, one leg of which is in a vertical plane and another leg of which is in a horizontal plane.

Connected to the vertical leg of the main support 21 and extending forwardly or outwardly therefrom, are a pair of spaced diverging bumper arms 22. The arms 22 are formed of flat strap material and bending them away from each other insures a rigid connection between the bumper element which I will describe and the bumper support.

The two bumper arms 22 are fastened to the main support 21 by spaced bolts 24. The bumper arms 22 have their outer ends bent at substantially right angles relative to the portion which is fastened to the support 21 as at 26, so that bumper elements may rest thereagainst and be fastened thereto.

A pair of bumper elements 28 are connected to the arms 22 of each of the supports A. The ends of the bumper elements 28 are formed with eyes 30. The eyes of the ends of the bumper register with each other and bolts 32 are used for connecting them together.

A lock washer 34 is interposed between the two bumper elements 28 at the ends thereof and the bolts 32 extend therethrough as clearly shown in Figure 6 of the drawings.

Bolts 36 are interposed between the two bumper elements 28 and extend through openings formed in the portions 26 of the arms 22. The bolts 36 serve to space the two bumper elements apart and at the same time serve as fastening means for securing the bumper elements to the bumper supports.

The bolts 32 in the ends of the bumper elements are drawn tight so that the ends of the bumper elements are inclined towards each other while the intermediate portions of the bumper elements are spaced apart and held in this spaced apart position by the bolts 36.

The result of tightening the bolts 32 is to place the bumper elements 28 under a tension or tendency to move towards each other with only the bolts 36 holding them apart.

Washers 38 may be mounted upon the bolts 36 and rest against the spaced bumper elements 28. Lock washers 40 are also mounted on the bolts 36 for preventing the bolts from accidentally coming loose.

The bumper arms 22 are of greater width than the distances between the two bumper elements and thus the ends of the arms 22 rest against a portion of the upper bumper element and against a portion of the lower bumper element.

No fitting or extra pieces are required for fastening the bumper elements to the bumper arms except the ordinary bolts 36. The bolts 36, therefore, serve as a spacing element between the two bumper elements and at the same time as a fastening means.

When the bolts 32 in the ends of the bumper elements are tightened as shown in Figure 6 of the drawings, there will be no tendency for the bolts 36 which are received between the bumper elements to permit longitudinal movement of the bumper elements.

Fixed to each end of the main support 21 of the bumper support A is an upstanding fitting or plate 42. The plate 42 is notched or slotted as at 44 for defining a pair of spaced lugs or standards 46 and 48.

The portions 46 and 48 are provided with openings 50 and 52. The plate 42 is riveted or otherwise fastened to the vertical portion of the angle support 20.

The upstanding lug or standard 46 is designed to be received in between two legs 16 of the brace 14. The standard 48 rests against the frame or chassis 10 just inwardly or rearwardly of the innermost leg 16 of the brace 14.

The brace 14 is normally fastened to the chassis 10 by a bolt 54 and I simply arrange the opening 50 in the standard 46 to register with the bolt 54 and use this bolt as one of the fastening bolts for securing the bumper support to the automobile chassis.

A bolt 56 is extended through the opening 52 in the standard 48 and also passes through an opening formed in the chassis 10 for connecting the standard 48 thereto.

From the construction of the parts just described it will be seen that the standard 48 rests against the inner leg 16 of the fender brace 14 while the standard 46 is received between the two legs of the brace 14.

This construction gives me a very rigid and positive fastening between the inner ends of the bumper supports and the chassis 10.

The main part of the support is in a plane below the chassis 10 so that it may pass below any of the other fittings upon the chassis 10 without interfering therewith.

The upstanding fitting 42 is what rests against the chassis 10.

In Figures 7 and 8 I have shown the bumper support A as formed of the two arms 22. The arms 22 in this case have their inner ends resting against each other and a bolt 24 may be extended through openings formed therein and through openings in the chassis 58 of a type of automobile other than a Ford.

It may be here mentioned that in some makes of automobiles the chassis has its ends projected forwardly and rearwardly beyond the main body and it is to this portion that two arms 22 may be fastened for mounting the bumper upon the automobile.

The end of the chassis 58 is downwardly inclined or curved. A clip or clamp 60 extends around the arms 22 and a bolt 62 passes through the clip and into the chassis 58. The bolt 62 does not pass through the arms 22 but holds the clip 60 in position where it will hold the arms 22 against the chassis.

The arms 22 may rest upon the bolt 62 as shown in Figure 9 of the drawings. The use of the clip 60 enables the proper positioning of the arms 22 relative to the chassis 58 and thus the bumper is positioned properly, relative to the automobile.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. In combination with an automobile chassis, a bumper comprising a support secured thereto, a pair of bumper elements having their intermediate portions spaced from each other, bolts extending between said bumper elements for holding them spaced and fastening them to said support and bolts mounted in the ends of said bumper elements for drawing them together and placing said first bolts under tension.

2. In combination with an automobile chassis, a bumper comprising a support secured thereto, a pair of bumper elements having their intermediate portions spaced from each other, bolts extending between said bumper elements for holding them spaced and fastening them to said support, said bumper elements having eyes formed on their ends, bolts extended through the eyes for fastening the ends of said elements together whereby the ends of the bumper elements may be drawn together and the intermediate portion will be held spaced apart by said first bolts.

3. In combination with an automobile chassis, a bumper comprising a support secured thereto, a pair of bumper elements having their intermediate portions spaced from each other, bolts extending between said bumper elements for holding them spaced and fastening them to said support, said bumper elements having eyes formed on their ends, bolts extended through the eyes for fastening the ends of said elements together whereby the ends of the bumper elements may be drawn together one above the other and the intermediate portion will be held spaced apart by said first bolts.

4. In combination with an automobile chassis, a bumper comprising a support secured thereto, a pair of bumper elements having their intermediate portions spaced from each other, bolts extending between said bumper elements for holding them spaced and fastening them to said support and fastening means for holding the ends of the bumper elements one above the other and closer together than their intermediate portions whereby the intermediate portions are placed under tension.

5. In combination with an automobile chassis, a bumper comprising means for fastening bumper elements to the chassis, said means including diverging arms fastened together at one end, bumper elements secured to the other ends of said arms and spaced one above the other, said bumper elements having their intermediate portions spaced from each other and normally tending to move towards each other and having their ends fastened together and bolts extended between the intermediate portions of the bumper elements for fastening them to said arms.

6. In combination with an automobile chassis, a bumper comprising means for fastening bumper elements to the chassis, said means including diverging arms fastened together at one end, bumper elements secured to the other ends of said arms, said bumper elements having their ends fastened together and their intermediate portions spaced apart a greater distance than their ends and bolts for connecting the bumper elements to the arms and for holding the intermediate portions of the bumper elements spaced apart.

7. In combination with an automobile chassis, a bumper comprising means for fastening bumper elements to the chassis, said means including diverging arms fastened together at one end, a pair of bumper elements, common means for fastening said bumper elements to the arms and for spacing them apart throughout their length, the ends of the bumper elements projecting beyond said common means, means for inclining said projected ends towards each other, means for fastening said ends whereby said ends are retained against returning to normally spaced position.

8. In combination with an automobile chassis, a bumper comprising a support secured thereto, a pair of bumper elements spaced from each other, means for securing said bumper elements to said support whereby the ends of said elements are normally spaced and means for clamping said ends together whereby tension is applied to said elements to constrain them to engage said bumper element securing means.

9. In combination with the frame member of an automobile, said frame member having a channel-shaped brace secured thereto, a bumper comprising a support, a plate secured to one end thereof, a notch in said plate whereby a pair of upstanding lugs are formed of said plate, means for securing said lugs to the frame member of the automobile with one of said lugs extending between the flanges of said channel brace and resting against the web thereof, a pair of bumper elements, means for securing said bumper elements in spaced relation on the free end of said support and means for clamping the spaced ends of said elements together for constraining the intermediate portions thereof toward each other.

10. The combination of an automobile frame, a fender, a channel shaped brace for supporting the fender relative to the frame and means for connecting the channel-shaped brace to the frame, with a bumper comprising a support, an upstanding plate secured to the inner end of said support and extending up into the channel shaped brace and connected thereto by said fastening means, a pair of bumper elements having their intermediate portions spaced from each other and under tension and having their ends fastened together and means extending through the space between said bumper elements for fastening them to the support.

11. The combination of an automobile frame, a fender, a channel-shaped brace for supporting the fender relative to the frame and means for connecting the channel-shaped brace to the frame, with a bumper comprising a support, an upstanding plate secured to the inner end of said support and extending up into the channel-shaped brace and connected thereto by said fastening means, a pair of bumper elements, means for securing said bumper elements in spaced relation on the free end of said support and means for clamping the spaced ends of said elements together for constraining the intermediate portions thereof toward each other.

12. The combination of an automobile frame, a fender, a channel-shaped brace for supporting the fender relative to the frame and means for connecting the channel-shaped brace to the frame, with a bumper comprising a support, an upstanding plate secured to the inner end of said support and extending up into the channel-shaped brace and connected thereto by said fastening means, means for connecting bumper elements to said support having parts projecting transversely thereof, bolts in the free ends of said parts, a bumper element above and a bumper element below said bolts held apart by said bolts and fastened to said parts thereby.

13. The combination of an automobile frame, a fender, a channel-shaped brace for supporting the fender relative to the frame and means for connecting the channel-shaped brace to the frame, with a bumper comprising a support, an upstanding plate secured to the inner end of said support and extending up into the channel-shaped brace and connected thereto by said connecting means, means for connecting bumper elements to said support having parts projecting transversely thereof, bolts in free ends of said parts, a bumper element above and a bumper element below said bolts held apart by said bolts and fastened to said parts thereby and means whereby said bumper elements are constrained to move towards each other.

14. The combination of an automobile frame, a fender, a channel-shaped brace for supporting the fender relative to the frame and means for connecting the channel-shaped brace to the frame, with a bumper comprising a support, a pair of spaced upstanding lugs secured to said support, one of said lugs extending between the flanges of said channel brace and adapted to be secured against the web thereof by the means for connecting the channel-shaped brace to the frame, the other of said lugs adapted to engage one of said flanges on the outside thereof and be secured to said frame and a bumper device mounted on said support.

15. In combination with the frame member of an automobile, said frame member having a channel-shaped brace secured thereto, a bumper comprising a support, a plate secured to said support, a notch in said plate whereby a pair of upstanding lugs are formed of said plate, means for securing said lugs to the frame member of the automobile with one of said lugs extending between the flanges of said channel-shaped brace and resting against the web thereof, a pair of bumper elements, means for securing said bumper elements in spaced relation on the free end of said support.

16. In combination with the frame member of an automobile, said frame member having a channel-shaped brace secured thereto, a bumper comprising a support, a plate secured to said support, a notch in said plate whereby a pair of upstanding lugs are formed of said plate, means for securing said lugs to the frame member of the automobile with one of said lugs extending between the flanges of said channel-shaped brace and resting against the web thereof and a bumper connected to and supported on said support.

17. In combination with a frame member of an automobile, said frame having a channel-shaped fender brace secured thereto, a bumper comprising a support, an upstanding plate secured to said support, a notch in said plate whereby a pair of upstanding lugs are formed of said plate, each of said plates having an opening thereon, bolts extending through said openings for securing said lugs to the frame member of the automobile with one of said lugs extending between the flanges of said channel shaped brace and resting against the web thereof and the other of said lugs resting against the frame and adjacent the channel-shaped brace and a pair of bumper elements mounted upon the free end of said support.

Des Moines, Iowa, May 21, 1926.

BENNIE P. HANSON.